Dec. 19, 1933.  A. J. OTTO  1,939,915
HEAT CONTROLLING MECHANISM
Filed Sept. 11, 1931

Inventor
Arthur J. Otto
By
Attorneys

UNITED STATES PATENT OFFICE 1,939,915

HEAT CONTROLLING MECHANISM

Arthur J. Otto, Milwaukee, Wis., assignor to Johnson Service Company, Milwaukee, Wis., a corporation of Wisconsin Application September 11, 1931
Serial No. 562,407

3 Claims. (Cl. 137—139)

This invention relates to control of heating systems, and particularly to mechanism for opening and closing large steam valves, such as are used on riser pipes.

As a general rule it is necessary to open these valves slowly and desirable to close them relatively rapidly. The invention provides mechanism by which this result can be secured, and is further capable of adjustment so that the opening rate and the closing rate may be individually determined within the limits of adjustment afforded.

The preferred embodiments of the invention are illustrated in the accompanying drawing, in which:—

Figure 1:
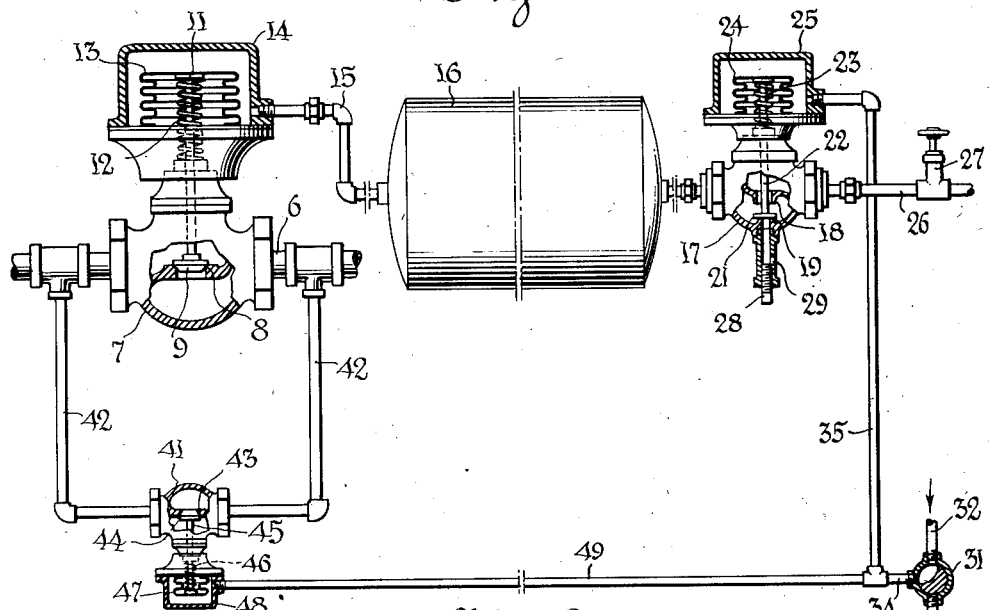
Fig. 1 is a diagrammatic view, partly in section, showing the arrangement in which the steam controlling valves are normally open and are held closed by pressure.

Referring first to Fig. 1, 6 represents a portion of the steam riser pipe of a heating system or any similar steam line in which flow is to be controlled. 7 represents the body of the main steam controlling valve. This valve is provided with a seat 8 with which coacts a valve 9. This valve is mounted on a stem 11 urged in an opening direction by a coil spring 12.

Reacting downward against the upper end of the stem 11 is a bellows motor 13 enclosed within a cap or housing 14 which in turn is mounted on the body 7. The housing 14 and the bellows 13 form an expansible chamber motor of well known form.

In order to increase the clearance volume of the working space in this motor, the space within the housing 14 is connected by a pipe 15 with a reservoir or chamber 16. Flow to and from the working space of the motor is controlled by an admission and exhaust valve which for convenience is connected directly to the reservoir 16.

The body of the admission and exhaust valve is indicated at 17, and this body is provided with two seats the first of which, 18, controls admission flow, and the second of which, 19, controls exhaust flow.

A disc valve 21 mounted on the stem 22 is shiftable from one to the other of the seats 18 and 19. It is urged toward seat 18 by a coil spring 23 and is actuated in the reverse direction by pressure acting on a metallic bellows 24 similar to the bellows 13. The bellows 24 is enclosed within a housing 25 to which pressure is admitted and exhausted for the purpose of shifting the valve 21 between the seats 18 and 19.

The supply to the valve body 17 arrives from any suitable source of elastic pressure fluid through a pipe 26 controlled by a throttling valve 27. Exhaust flow through the seat 19 is adjustably controlled by a threaded stem 28 which is adjustable to throttle more or less the exhaust bleed port 29.

Pressure acting on the bellows 24 is controlled by a three-way valve diagrammatically illustrated at 31. This valve has a supply connection 32 leading from any suitable source. This source may be the same as that which supplies pressure fluid to the pipe 26. It has an exhaust connection 33 and a third connection 34 which leads by way of pipe 35 to the space above the bellows 24.

The rate of closing of the valve 9 is controlled by adjusting the valve 27. If the valve 27 is wide open, the chamber 16 will charge rapidly and the valve 9 will be closed quickly. Slower rates of closing can be secured by partially closing the valve 27.

The opening of the valve 9 is controlled by adjusting the threaded stem 28. A slow rate of opening of valve 9 is secured by reducing the capacity of the bleed port 29.

In certain cases it is desirable to establish quickly a moderate initial flow through the riser pipe. To accomplish this, a valve body 41 is interposed in a by-pass around the valve body 7. This by-pass may take the form of pipes 42 or may be formed in any other convenient manner. The body 41 has a seat 43 with which a valve 44 coacts. This valve is actuated through a stem 45 by a coil spring 46 which acts in an opening direction and by a metallic bellows 47 which acts in a closing direction under pressure enclosed within the housing 48. This pressure arrives through a pipe 49, which, like the pipe 35, is connected to the connection 34 of the three-way valve 31.

When this arrangement is used, assuming that the valves are closed as shown in Fig. 1 and that the three-way valve 31 is turned to allow flow from the connection 34 to exhaust 33 and cut off the supply, the exhaust of pressure against bellows 47 allows the valve 44 to open and immediately establishes flow up to the capacity of the by-pass. At the same time, the pressure acting on the bellows 24 is relieved so that valve 21 moves against seat 18. This starts the slow exhaust to the chamber 16 through port 29. This is accompanied by slow release of pressure acting on the bellows 13 and consequent gradual opening of the valve 9.

Figure 2:
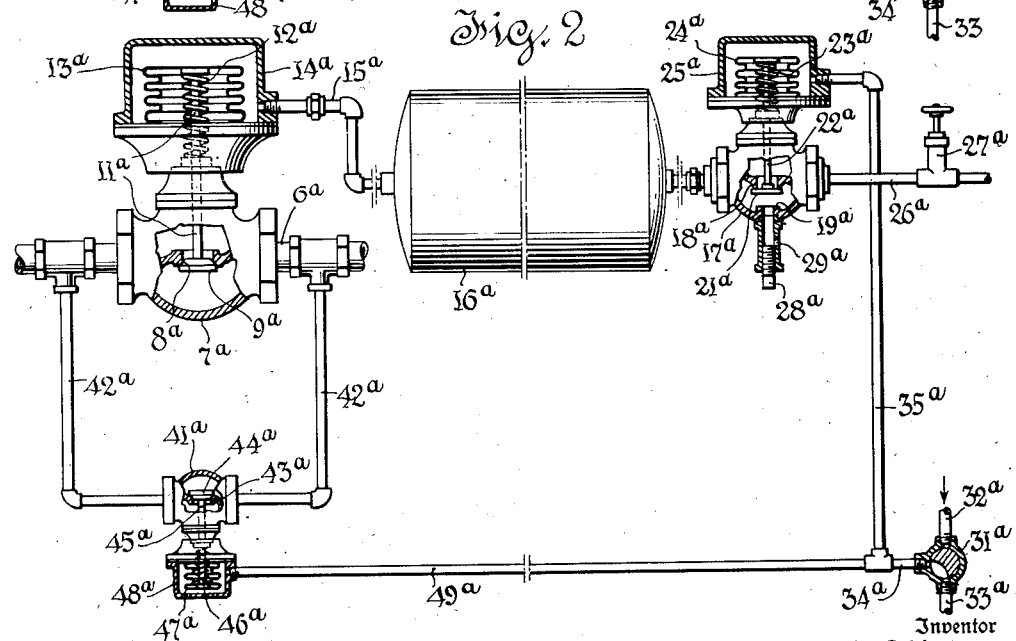
Fig. 2 is a similar view showing the reverse arrangement in which the valves are normally closed and are forced open by pressure.

In the structure of Fig. 2, the same reference numerals are used with the subscript "a" to indicate similar parts. The essential differences in structure are that the valve 9a and seat 8a and the valve 44a and seat 43a are reversely arranged with respect to the showing in Fig. 1.

Functionally the differences are that steam flow is stopped when the three-way valve 31a is in exhausting position and that valve 27a controls the rate of opening while the threaded stem 28a controls the rate of closing of the main steam valve.

In each of the constructions illustrated, the valves 31, 31a are merely conventionally indicated. These valves might be manually operated or they might be operated by any suitable automatic means, such for example as a thermostat. For example, the pneumatic thermostats manufactured by the Johnson Service Company under the patents of Warren S. Johnson and others embody a thermally controlled relay which actuates the combined admission and exhaust valve. These valves are suited to perform the function of the valves 31, 31a. However, it is immaterial to the present invention whether control be manual or automatic.

Obviously various specifically different embodiments of the invention can be made and no limitation to the particular structures illustrated is implied.

What is claimed is:—

1. The combination of a valve controlling the flow of a heating medium; an expansible chamber fluid pressure motor for actuating the same; means for imparting to the working space of said motor a substantial clearance volume; an admission and exhaust valve connected to control charging and venting flow to and from said motor; adjustable means for controlling the rate of charging flow through said valve; a fluid pressure motor for actuating said admission and exhaust valve; a valve controlling a by-pass of limited capacity around the first-named valve; a fluid pressure motor for actuating said by-pass valve; and means for controlling conjointly the motors of said admission and exhaust valve and of said by-pass valve.

2. The combination of a valve controlling the flow of a heating medium; an expansible chamber fluid pressure motor for actuating the same; means for imparting to the working space of said motor a substantial clearance volume; an admission and exhaust valve connected to control charging and venting flow to and from said motor; adjustable means for controlling the rate of venting flow through said valve; a fluid pressure motor for actuating said admission and exhaust valve; a valve controlling a by-pass of limited capacity around the first-named valve; a fluid pressure motor for actuating said by-pass valve; and means for controlling conjointly the motors of said admission and exhaust valve and of said by-pass valve.

3. The combination of a valve controlling the flow of a heating medium; an expansible chamber fluid pressure motor for actuating the same; means for imparting to the working space of said motor a substantial clearance volume; an admission and exhaust valve connected to control charging and venting flow to and from said motor; adjustable means for controlling the rate of charging flow through said valve; adjustable means for controlling the rate of venting flow through said valve; a fluid pressure motor for actuating said admission and exhaust valve; a valve controlling a by-pass of limited capacity around the first-named valve; a fluid pressure motor for actuating said by-pass valve; and means for controlling conjointly the motors of said admission and exhaust valve and of said by-pass valve.

ARTHUR J. OTTO.